United States Patent [19]
Plotnick et al.

[11] Patent Number: 4,836,697
[45] Date of Patent: Jun. 6, 1989

[54] AUTOMATED THERMAL TRANSFER DEVICE AND CONTROL SYSTEM THEREFOR

[75] Inventors: Michael A. Plotnick, Southampton, Pa.; Paul J. Shapiro, New York; Fred R. Stolfi, Shrub Oak, both of N.Y.

[73] Assignee: Kroy Inc., Scottsdale, Ariz.

[21] Appl. No.: 170,796

[22] Filed: Mar. 21, 1988

[51] Int. Cl.$^4$ .......................... B41J 3/02; H05D 1/00
[52] U.S. Cl. ................................ 400/120; 346/76 PH; 219/216; 400/73
[58] Field of Search ...................... 400/241.4, 120, 73, 400/103; 346/76 PH; 219/216

[56] References Cited
U.S. PATENT DOCUMENTS

| | | | |
|---|---|---|---|
| 3,941,051 | 3/1976 | Barrus et al. | 101/93.04 |
| 4,459,050 | 7/1984 | Goldberg et al. | 400/121 |
| 4,462,708 | 7/1984 | Luartes et al. | 400/304 |
| 4,492,482 | 1/1985 | Eguchi et al. | 400/120 |
| 4,556,892 | 12/1985 | Erlichman | 400/241.4 |
| 4,564,848 | 1/1986 | Kuzumi | 346/76 PH |
| 4,603,337 | 7/1986 | Erlichman | 346/76 PH |
| 4,630,069 | 12/1986 | Erlichman | 346/76 PH |
| 4,666,319 | 5/1987 | Hirosaki et al. | 400/120 |
| 4,673,304 | 6/1987 | Liu et al. | 400/120 |
| 4,695,850 | 12/1987 | Nubson | 346/76 PH |
| 4,788,426 | 11/1988 | Kuehnie | 355/14 R |

FOREIGN PATENT DOCUMENTS

| | | | |
|---|---|---|---|
| 0012858 | 7/1980 | European Pat. Off. | 400/120 |
| 0128478 | 10/1980 | Japan | 400/120 |
| 0144773 | 9/1982 | Japan | 400/120 |
| 0201686 | 11/1983 | Japan | 400/120 |
| 0071273 | 4/1985 | Japan | 400/120 |
| 0114866 | 6/1986 | Japan | 400/120 |

OTHER PUBLICATIONS

"Pulse Width Energy Control for Resistive Ribbon Thermal Transfer Printer Using Pel Counting", Stored value Energy Control for Resistive Ribbon Thermal Transfer printer, Research Disclosure, Jul. 1987, No. 279, Kenneth Mason Publications Ltd., England, 400/120.
Product Brochure, *Merlin Express*, by Varitronic Systems, Inc., Dec. 1986, Part No. 1358-1400.

Primary Examiner—Eugene H. Eickholt
Attorney, Agent, or Firm—Dorsey & Whitney

[57] ABSTRACT

A control system for a thermal transfer device in which a selected image is transferred from a strip of color carrying ribbon to a strip of image carrying tape and precise alignment between adjacent columns of vertical print is achieved by monitoring and controlling the rotational speed of the drive means for the thermal transfer device and activating the printing of each column of pixel data based upon positional information of the tape and ribbon determined in relation to the rotational speed of the drive means so that each column of pixel data is of a uniform and consistent width.

15 Claims, 6 Drawing Sheets

AUTOMATED THERMAL TRANSFER DEVICE AND CONTROL SYSTEM THEREFOR

RELATED APPLICATIONS

This application is related to co-pending application entitled TAPE-RIBBON SUPPLY SYSTEM FOR A THERMAL TRANSFER DEVICE OR THE LIKE, filed in the United States Patent and Trademark Office on Feb. 1, 1988 and identified by Ser. No. 151,103, to co-pending application entitled THERMAL TRANSFER DEVICE AND TAPE-RIBBON CARTRIDGE THEREFOR, filed in the United States Patent and Trademark Office on Feb. 1, 1988 and identified by Ser. No. 151,110, to co-pending application entitled THERMAL TRANSFER DEVICE AND TAPE-RIBBON CARTRIDGE EMBODYING A TAPE CUT-OFF MECHANISM, filed in the United States Patent and Trademark Office on Feb. 1, 1988 and identified by Ser. No. 151,109, and to co-pending application entitled PIXEL PREHEAT SYSTEM FOR AN AUTOMATED THERMAL TRANSFER DEVICE, filed in the United States Patent and Trademark Office on Mar. 21, 1988 and identified by Ser. No. 170,756.

TECHNICAL FIELD

The present invention relates generally to the field of printing apparatus or composing systems, and more particularly, to an improved control means for a printing apparatus or composing system of the type involving the use of a thermal process to transfer pixel images of a desired character or design from a color carrying ribbon onto an image carrying tape as a result of the localized application heat and pressure at each pixel. This type of printing apparatus or composing system has particular application in the printing of relatively large characters or sequences of characters of varying type sizes and fonts for us in preparing lettering for engineering drawings, flip charts, overhead, transparencies, posters, advertising brochures, identification labels and the like. The characters printed by this type of printing apparatus or system are generally larger than characters produced by most typewriters or the like and include a wide variety of type sizes and fonts for alphanumeric characters, along with any number of special characters or images such as symbols, logos and trademarks.

Tape lettering systems employing a dry lettering printing process that mechanically transfer an impression of a character on a rotatable type disc from a dry film ribbon to an image carrying tape by means of an impact means or pressure printing force are well known in the prior art, and are shown and described in U.S. Pat. Nos. 3,834,507; 4,243,333; and 4,402,619. An automated tape lettering machine employing this process is shown and described in U.S. Pat. No. 4,462,708. While each of these prior art machines is capable of generating high quality printing and lettering results, there is a need for a high speed tape printing apparatus capable of generating high quality characters without the limitations imposed by using an impact or pressure lettering device.

Thermal transfer printing devices also exist in which an image of a desired character is formed on a strip of image carrying tape by transferring ink or other color from a color carrying ribbon to the tape as a result of the localized application of heat and a small amount of pressure. A typical thermal transfer device of this type is described in U.S. Pat. No. 4,666,319. Another thermal transfer device presently available employs a thermal print head for transferring images from a strip of ribbon to a strip of tape and has a cooperating tape-ribbon cartridge for providing a supply of tape and ribbon to the device. While such devices are useful for printing smaller point size characters represented in a dot-matrix array font format, the control systems required by such devices are incapable of handling the precision and accuracy required for the high speed generation of high quality characters, particularly characters of larger point sizes.

In some of the thermal transfer devices described above, a platen roller located directly opposite the printhead is used to frictionally engage the tape and ribbon and advance the same past the printhead. This arrangement is undesirable in that the pressure necessary to insure that the tape and ribbon will be frictionally advanced by the platen roller is greater than the optimum pressure necessary to achieve a high quality thermal transfer. In other thermal transfer devices, a ribbon take-up spool or spindle is used to simply pull the tape and ribbon past the printhead. This arrangement is also undesirable, however, in that the driving force is applied only to the ribbon and misalignment between the ribbon and tape may occur. Additionally, in all such thermal transfer devices, any variations in the speed of the platen drive roller or the ribbon take-up spindle negatively impact the quality of print by smearing or smudging the pixel images at a given vertical segment of the tape or by causing a gap between adjacent or corresponding columns of print. Though this smearing or smudging of pixels is desirable in many printers where the transfer ink will melt or smear together to create a consistent and uniform image, it is undesirable in a high quality, high speed tape printing apparatus of the type contemplated by the present invention. Because the ribbon used in high quality thermal transfer tape printing apparatus is usually some type of plastic based ribbon, the pixel images transferred from the ribbon to the tape are uniformly defined and do not smear or smudge into one another. Therefore, precise alignment between vertical columns of print is necessary to achieve high quality, high speed lettering results when using a thermal transfer tape printing apparatus of the type contemplated by the present invention.

Accordingly, although the above described prior devices may be satisfactory for various uses and applications, they are limited in the sizes and fonts of the characters that can be printed and in the combination of speed and quality of the characters to be printed on the tape. Thus, there is a continuing need for improvements in the control systems associated with tape lettering printing apparatus, and, in particular, with the control systems associated with thermal transfer devices to allow for the generation of high speed, high quality images on a strip of tape.

SUMMARY OF THE INVENTION

In accordance with the present invention, a thermal transfer device, and in particular a control system for such a device, is provided in which an image of a desired character is transferred from a strip of color carrying ribbon to a strip of image carrying tape. Generally, such a device includes an image transfer station defined by a printhead and a cylindrical platen and rotary drive means for advancing the tape and ribbon from a supply cartridge past the image transfer station. It may also include a tape-ribbon cartridge embodying an internal tape-cut mechanism and an input module for entering, editing, storing and transmitting the selected characters or designs to be printed on the tape.

The control system of the present invention controls the mechanisms for transferring an image of a selected character or design from a ribbon to a tape. In a preferred embodiment of the invention, the control system is comprised of a programmable data processing means for receiving print data and control codes representing the desired characters or designs to be printed and for controlling the printing of that information by the image transfer station. The data processing means is also connected to a detector means for monitoring the speed and position of the rotary drive means. The speed of the rotary drive means as determined by the detector means is used by a feedback means to control the speed at which the rotary drive means advances the tape and ribbon past the image transfer station. The speed of the rotary drive means as determined by the detector means is also utilized to calculate position information of the tape and ribbon relative to the image transfer station. This position information is used by the data processing means to control the time at which print data is output to the printhead to insure that a precise alignment between corresponding vertical columns of print data is achieved.

Accordingly, a primary object of the present invention is to provide an improved control system for a thermal transfer tape lettering device for transferring characters of a wide variety of type sizes and fonts from a strip of ribbon to a strip of image carrying tape.

Another object of the present invention is to provide an improved control system for an image transfer station that will monitor and control the speed at which the tape and ribbon are advanced past the image transfer station and output the data to be printed by the image transfer station in relation to the position of the tape and ribbon as they are advanced past the image transfer station for the purpose of insuring a more accurate alignment between corresponding vertical columns of print data.

Another object of the present invention is to provide an improved control system for a thermal transfer strip printer which monitors and controls the rotational speed of a rotary drive means and controls the position at which the image is transferred to the tape.

These and other objects of the present invention will become apparent with reference to the drawings, the detailed description of the preferred embodiment and the appended claims.

DESCRIPTION OF THE PRERFERRED EMBODIMENT

Figure 1:
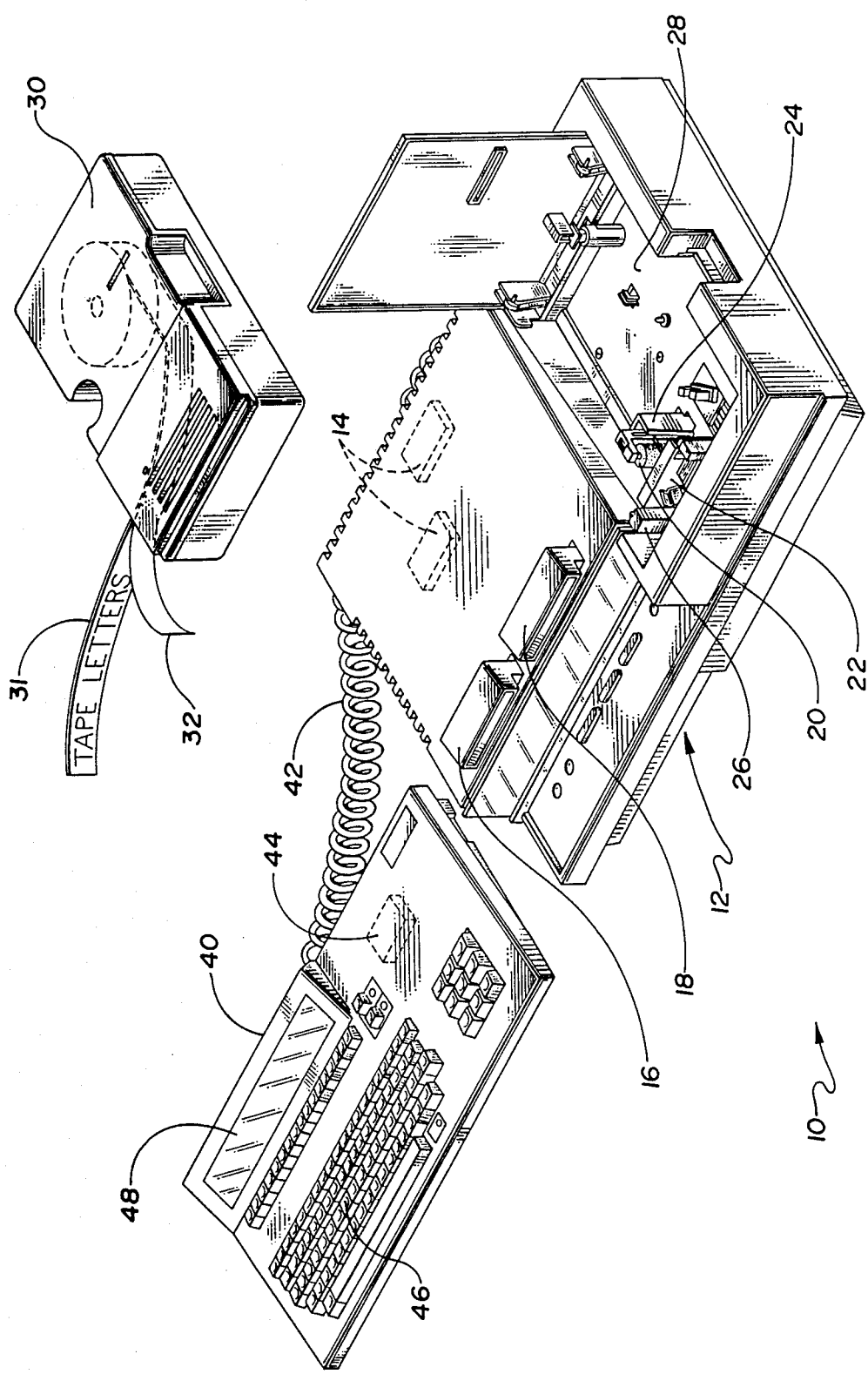
FIG. 1 is an exploded pictorial view of a tape lettering printing apparatus in acccordance with the present invention showing a thermal transfer device with associated tape-ribbon cartridge, and an input module with an umbilical cord attachment to the thermal transfer device.

Referring to FIG. 1, an exploded pictorial view of a tape lettering or printing apparatus 10 in accordance with the present invention is shown. Although the preferred embodiment is a thermal transfer device, it is contemplated that the features of the present invention are applicable to other similar tape lettering apparatus and strip printers as well. As illustrated in FIG. 1, the operative components of the tape lettering or printing apparatus 10 gnerally include a thermal transfer device 12 embodying, a processing means 14, a pair of font cartridges 16 and 18, a rotary drive means 26 and an image transfer station 20 defined by and disposed between a printhead assembly 22 and a cooperating platen assembly 24. Associated with the transfer device 12 is a movable cartridge service or receiving tray 28 for receiving a tape-ribbon cartridge 30. The cartridge 30 includes a supply of tape and ribbon for providing a tape 31 and a ribbon 32 to the image transfer station 20. The printing apparatus 10 further comprises an input means 40 for entering, editing, storing, manipulating, and/or transmitting input data to the processing means 14 via an umbilical cord interface 42. In the preferred embodiment, the input means 40 comprises a programmable digital microprocessor 44, a keyboard 46 and a display 48. The input means 40 may also, however, be a digital computer or other device capable of interfacing with the processing means 14 through the interface 42. In a preferred embodiment, the interface 42 is an RS-232-C communication port.

Although the control system has applicability to various lettering apparatus and strip printers, it has particular applicability to a thermal transfer device and associated tape-ribbon cartridge of the type shown and disclosed in co-pending applications entitled TAPE-RIBBON SUPPLY SYSTEM FOR A THERMAL TRANSFER DEVICE OR THE LIKE, Ser. No. 151,103, THERMAL TRANSFER DEVICE AND TAPE-RIBBON CARTRIDGE THEREFOR, Ser. No. 151,110, and THERMAL TRANSFER DEVICE AND TAPE-RIBBON CARTRIDGE EMBODYING A TAPE CUT-OFF MECHANISM, Ser. No. 151,109, all filed on Feb. 1, 1988 and all of which are incorporated by reference herein.

Figure 2:
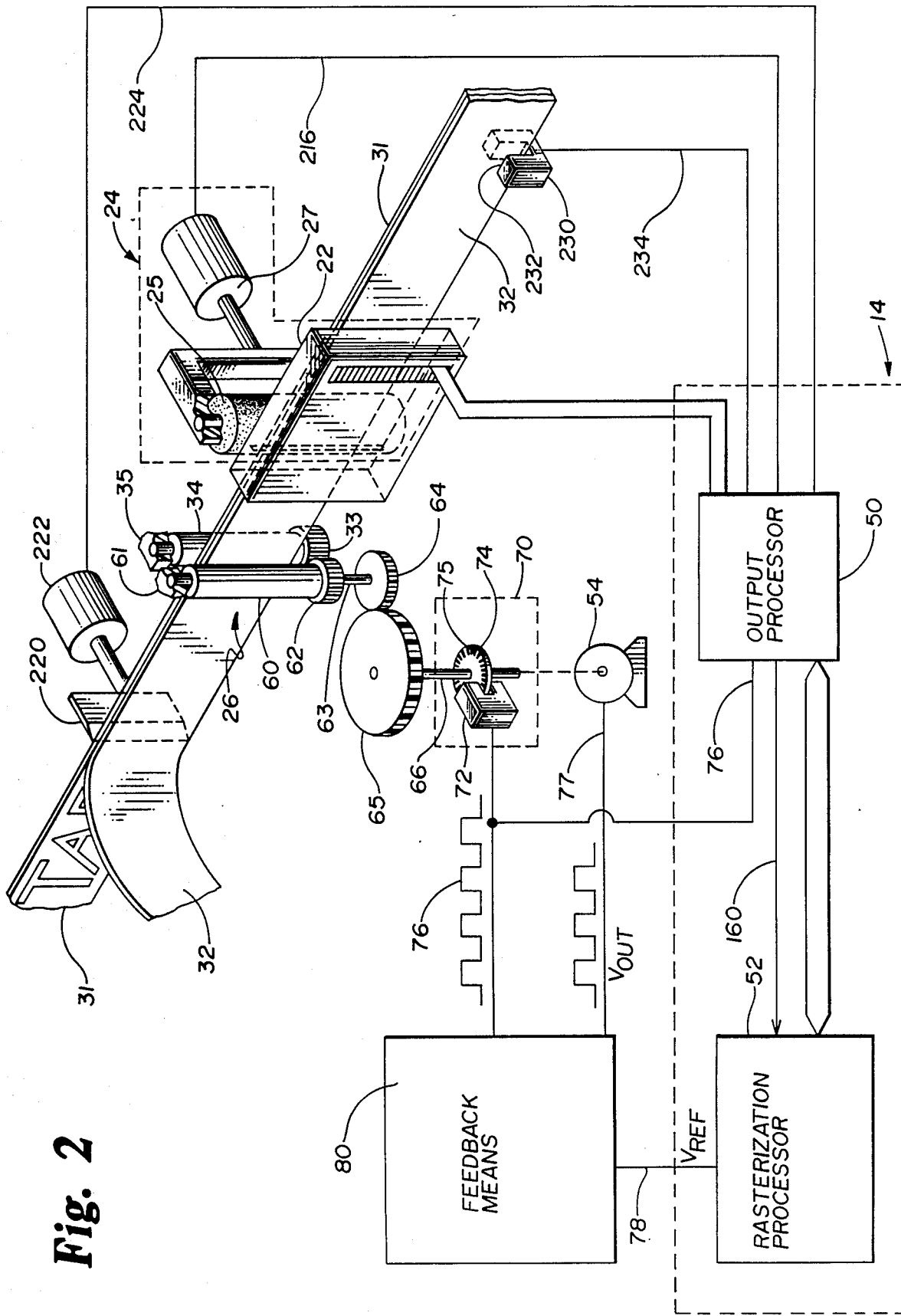
FIG. 2 is a functional diagram of the control system for the thermal transfer device of the present invention showing various operative components of such system.

As illustrated best in FIG. 2, the operative components of the thermal transfer device utilizing the control system of the present invention include a printhead assembly 22, a platen assembly 24 and a tape-ribbon drive means 26. In the preferred embodiment, the drive means 26 is a rotary drive means comprised of a drive motor 54 and an associated pair of drive roller 60 and 34 located downstream from the printhead and platen assemblies 22 and 24. The drive rollers 22 and 24 function to advance the tape 31 and ribbon 32 past the transfer station 20 defined by and positioned between the printhead and platen assemblies. The drive roller 60 is rotatably mounted within a drive roller housing 61 with top end of the drive roller shaft journaled in a portion of the housing 61. Adjacent to the lower end of the drive roller 60 is a drive gear 62 that is designed for meshing engagement with a corresponding drive gear 33 associated with the drive roller 34. The drive roller 34 is rotatably journaled in a housing portion 35. Although it is contemplated that both rollers 60 and 34 could be rotatably mounted in a common housing, the roller 60 of the preferred embodiment is mounted in a portion of the machine housing 61, while the roller 34 is mounted in a portion of a tape-ribbon cartridge housing 35. Such a structure is illustrated in each of the related applications filed Feb. 1, 1988 and referred to above. In the preferred structure, the drive roller 34 is biased into engagement with the driver roller 60 by a pair of spring members (not shown) in the cartridge 30 (FIG. 1).

A drive roller shaft 63 extends downwardly from the drive roller 60 and is connected at its lower end with a toothed gear 64. The toothed gear 64 is connected via an appropriate gear assembly 65 and a motor shaft 66 to the drive motor 54. In the preferred embodiment, the gear assembly 65 can comprise either a single gear as shown in the drawings or multiple gears. With this structure, rotation of the drive motor 54 causes rotation of the gear 64 of the drive roller 60. Rotation of the drive roller 60 causes corresponding rotation of the drive roller 34 as a result of the engagement between the gears 62 and 33. When the tape 31 and ribbon 32 are disposed between the drive rollers 60 and 34, this rotating advances the tape 31 and ribbon 32 past the transfer station 20. In a preferred embodiment of the invention, the drive motor 54 is a DC-servo motor, Model EN35-151N1B, available from Canon Precision of Tokyo, Japan. The motor 54 is a pulse driven motor or a servo motor driven with a pulse-width-modulated voltage pulse for high efficiency.

Mounted on the shaft 66 and positioned between the motor 54 and the gear 65 is an optical detection means or rotational optical encoder 70 for detecting the rotational speed of the shaft 66 so that the speed of the tape 31 and ribbon 32 and the position of the tape 31 and ribbon 32 relative to the printhead assembly 22 can be determined. In a preferred embodiment of the invention, the detection means 70 is implemented using a conventional rotational optical encoder or chopper wheel photo-detector having an optical interrupter 74 mounted on the motor shaft 66 and positioned between the motor 54 and the gear assembly 65. The optical interrupter is a plastic disc having a plurality of vanes 75. The interrupter 74 is coupled to the motor shaft 66 and is disposed between a light source and a photo-detector located in the detector housing 72. By detecting the presence or absence of light within the photo-detector 72, the detection means 70 translates the rotational speed of the shaft 66 into a digital pulse train or Processed Encoded Tick ($V_{pet}$) 76 having a frequency corresponding to the rotational speed of shaft 66. With continuing reference to FIG. 2, the platen assembly 24 includes a rotatable, cylindrically shaped platen 25 which is movable into an image transfer position relative to the printhead assembly 22. Movement of the platen 25 into such position is caused by the linear actuator 27 to create the desired printing pressure between the platen 25 and the printhead assembly 22.

The structure illustrated in FIG. 2 also includes an electronic tape-ribbon sensor 230 positioned from the printhead assembly 22 and a tape cut-off mechanism 220 positioned downstream from the tape-ribbon drive means 26. The detailed structure of these components as well as the printhead assembly 22, the platen assembly 24, the drive assembly 26 and other components are disclosed in the above identified related applications filed Feb. 1, 1988, the disclosure of which is herein incorporated by reference.

Figure 5:
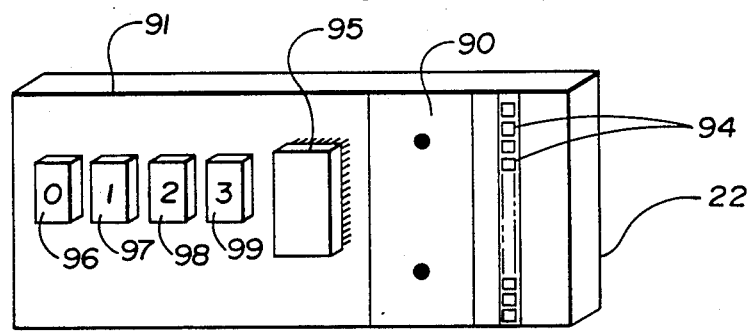
FIG. 5 is a pictorial view of the printhead assembly of the thermal transfer device.

Reference is next made to FIG. 5 showing the printhead assembly 22. The printhead assembly 22 comprises a printhead 90 and an associated heat sink 91 mounted to a frame (not shown) for operative alignment with the platen assembly 24 (FIG. 2). The printhead assembly 22 is electrically connected to the processing means 14 (FIG. 1) via an appropriate electrical connector. In the preferred embodiment, the printhead 90 is a single column 300 dpi (dots per inch) thin film thermal printhead with associated integrated circuit drivers and which is identified as Model KFT-22-12MPE1-PA available from Kyocera International of Framingham, Mass. The printhead 90 consists of a single column of square heating elements 94, each heating element 94 representing a unique pixel and being electrically connected to a driver circuit 95. The driver circuit 95 electronically controls the head temperature of all of the heating elements 94. The printhead 90 of the preferred embodiment includes 256 heating elements 94 serially driven by four sixty-four bit driver chips illustrated by reference numerals 96, 97, 98 and 99. As will be described further below, the driver circuit 95 receives data from the four driver chips (HIGH to print and LOW to not print) and applies a printing voltage to each of the heating elements 94 to thermally transfer the square area corresponding to that heating element from the thermal ribbon 32 to the image carrying tape 31. A thermal transfer ribbon 32 suitable for use with the preferred embodiment of this invention is Thermal Transfer Ribbon, Model TRX-6-5-4 available from Fuji Kagakusi of Kogyo, Japan. The image carrying tape 31 may be any type of plastic or polymer based film that is capable of receiving a thermal transfer of an image without distorting the substrate or carrier material.

Figure 3:
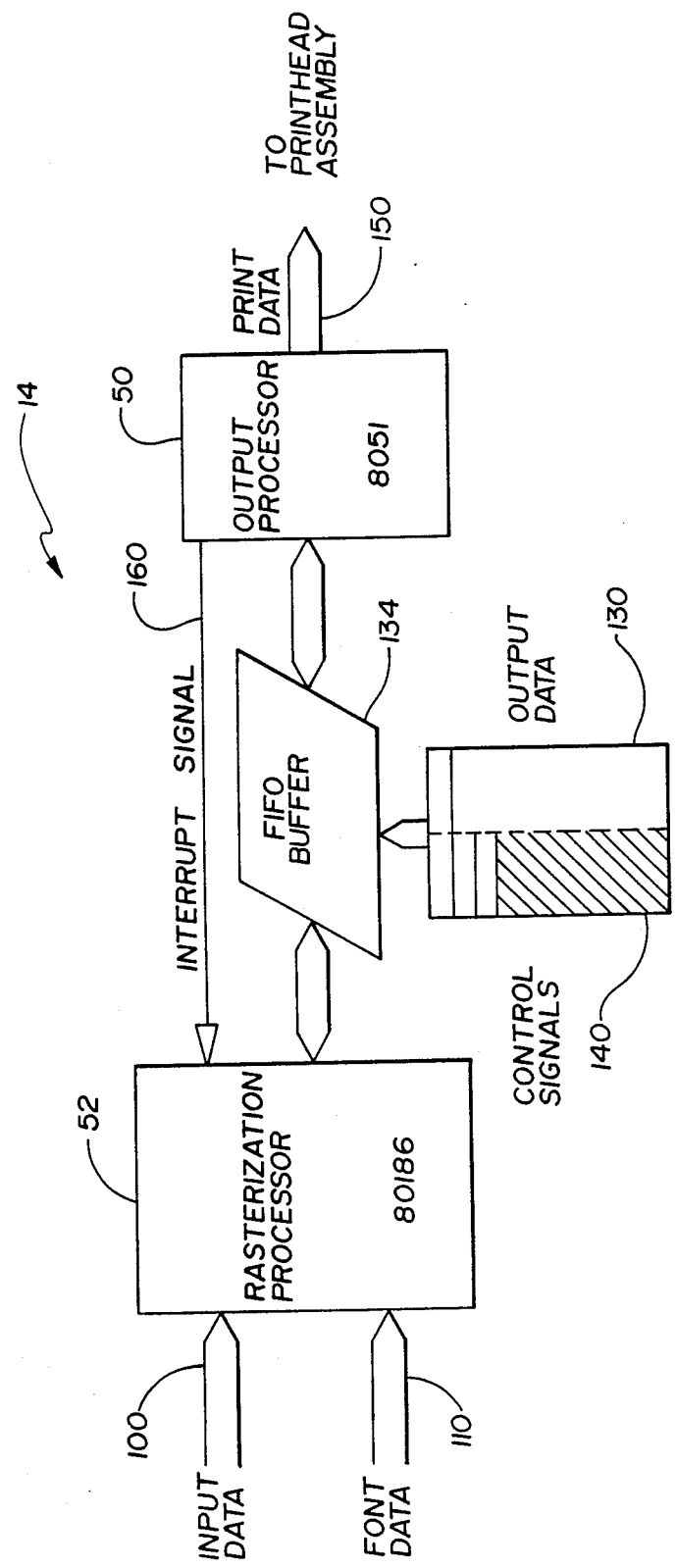
FIG. 3 is a block diagram showing the data flow for processing means of the present invention.

Referring now to FIGS. 2 and 3, the operation of a preferred embodiment of the control system of the present invention will be explained. In general the control system of the present invention includes a processing means (generally illustrated in FIG. 1 by the reference numeral 14 and more specifically illustrated in FIGS. 2 and 3 by the reference numerals 50 and 52) for receiving various input data and processing the same to generate data and control signals to drive the printhead assembly 22. More specifically, the processor 52 receives Input Data 100 representing selected characters or designs to be printed and Font Data 110 generally representing a set of character outlines. The processor 52 then processes the Input Data 100 and Font Data 110 to generate Output Data 130 and Control Signals 140, through a FIFO Buffer 134, to be provided to the output processor 50 in response to an Interrupt Signal 160. The output processor 50 receives the Output Data 130 and Control Signals 140 and provides the printhead assembly 22 with Print Data 150 in the form of a single columnar set of pixel data representing the selected characters to be printed. The processor 50 also supplies Control Signals 140 to the printhead assembly 22 to print the characters represented by Output Data 130.

The combination of features that make up the processing means 50, 52 of the present invention is preferably controlled by a stored software program that operates on the data in the manner described in connection with FIG. 3, although those skilled in the art will recognize that software functions can be accomplished by equivalent hardware. While a pair of microprocessors 50 and 52 are shown as a preferred embodiment of processing means 14, it should also be recognized that the invention could also be achieved through the use of a single microcomputer and associated circuitry, or multiple microcomputers and associated circuitry, or any combination thereof. In the preferred embodiment of the invention, both processors 50 and 52 are programmable digital microprocessors with the output processor 50 being an 8051 microprocessor available from Intel Corporation of Santa Clara, Calif. and the processor 52 being an 80186 rasterization microprocessor, also available from Intel Corporation.

Though in the preferred embodiment of the invention both Control Signals 140 and Print Data 150 are generated by a real-time rasterization system based on Input Data 100 representing the desired characters to be printed and Font Data 110 representing the outlines for such characters, it will be apparent to those skilled in the art that Control Signals 140 and Print Data 150 may be supplied by any number of methods or in any number of formats without departing from the spirit of the present invention. For example, Print Data 150 might be generated from a dot-matrix representation of the selected characters to be printed, instead of being based on an outline representation of the characters; or Print Data 150 might be simultaneously transmitted as multiple columns of pixel data, instead of sequentially transmitted as single columns of pixel data. Similarly, Control Signals 140 might be separate control lines connected to the output processor 50, or they might be incorporated as special control codes contained within Print Data 150.

Because the pixel images created by the thermal transfer of the ribbon 32 onto the tape 31 are of a consistent and uniform width and do not smear or smudge into a pixel element in the adjacent vertical column, precise alignment between vertical columns of pixels is necessary to avoid creating any white space between vertical columns of pixels and/or overlapping vertical columns of print. The present invention overcomes the inadequacies of the prior art by both controlling the speed at which the tape 31 and ribbon 32 are transported past the image transfer station 20 and by controlling and monitoring the position of the tape 31 and ribbon 32 so that each column of pixels is printed at the appropriate and predefined position on the tape. This is accomplished by the combination of a detection means 70 and a feedback means 80 that are connected to the drive motor 54 and the output processor 50.

During operation of the preferred thermal transfer device, the tape 31 and ribbon 32 are advanced past the image transfer station 20 by the drive rollers 60 and 34 at a constant rate (1 inch per second) and the vertical columns of pixel data are printed at a width of 300 pixels per inch. since the detector 70 is used for sensing both the proper location of the 300 pixels per inch and the proper drive speed, it must provide an integer multiple of 300 counts per inch, which also means 300 counts per second. Because of the operational characteristics of the drive motor 54, and to enable realization of the control circuitry described below, the desired detector 70 count rate was set at 1200 Hz. It is contemplated that software modification can be made to provide for different pixel width and frequency. It will be seen that various other types of detection means 70 would work equally well with the present invention. For example, any rotational detector means which produces position and speed information and which is mounted on the drive motor shaft 66 would achieve the same results as the rotational encoder 70. It is also seen that the placement of detection means 70 on the drive motor shaft 66 is optional, and that the detection means 70 could also be mounted on the drive roller shaft 63 and utilize a different detector count rate. Even though the objective is to monitor the speed and location of the drive roller 60, and thus the tape 31 and ribbon 32, locating the detection means 70 on the drive motor shaft 66 accomplishes this objective because the rotary drive means 26 is only operated in a forward direction and the gear ratio of gear assembly 65 is fixed and known.

It is also contemplated that detection means other than rotational speed detection means could be utilized. For example, detection means to detect the linear speed or movement of the tape 31 or ribbon 32 could be used as long as the means is capable of generating the tape-ribbon position and speed data needed for use in the processors 50 and 52.

Figure 4:
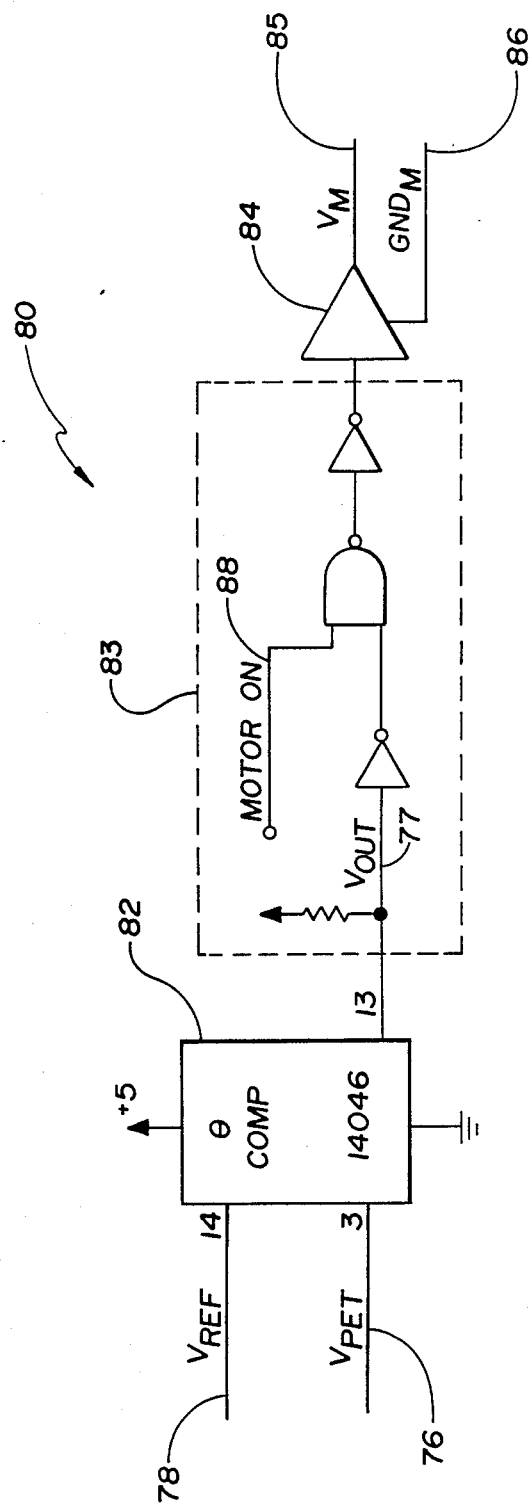
FIG. 4 is a simplified circuit diagram for the feedback means of the present invention.

Reference is next made to FIG. 4 illustrating the feedback means 80 used to monitor and control the speed of the motor 54. Essentially, the feedback means 80 cooperates with the rotary drive means 26 to operate in a fashion similar to a conventional Phase Locked Loop (PLL). During operation, the rotational frequency sensed by the detector 70 is compared to a reference frequency (Vref 78) in a phase comparator 82. The output of this comparison is then used to modify the speed of the motor 54. The mechanical inertia and electrical inductance of the motor operate as a filter for the PLL and the motor operates as the voltage controlled oscillator since, as the voltage to the motor is changed, the speed of the motor changes and so does the frequency of the signal from the detector. As shown in FIG. 4, the motor rotational frequency signal $V_{pet}$ 76 is one of two signals fed into the phase comparator 82 for generating the output voltage ($V_{out}$) 77 used to control the motor 54; the other is the reference frequency Vref 78. In the preferred embodiment, phase comparator 82 is comprised of a portion of a conventional PLL integrated circuit, in this case a 14046 Phase Locked Loop available from Motorola, Inc., of Austin, Tex. Also utilized in the feedback means 80 is an associated pull up circuitry 83 and a power driver 84 for presenting Vout 77 to the motor 54. The comparator 82 compares the frequency of $V_{pet}$ 76 at pin 3 with a reference frequency $V_{ref}$ 78 at pin 14. $V_{ref}$ 78 is selected to be exactly equal to the desired operating frequency for $V_{out}$ 77, namely, 1200 Hz. This establishes $V_{ref}$ 78 as the center frequency of the lock range of the feedback means 80. In one embodiment of the invention, $V_{ref}$ 78 is generated by the rasterization processor 52 based upon the master clock signal used to operate the 80186 microprocessor. As supplied to the drive motor 54, $V_{out}$ 77 is comprised of two outputs of the power driver 84, $V_m$ 85 and $GND_m$ 86, that are connected to the input terminals of the motor 54. It should be understood that the motor 54 is operated in a pulse-width-modulated fashion whereby the frequency of $V_{out}$ 77 controls the speed at which the motor 54 turns by determining how often the motor 54 is on. $V_{out}$ 77 is also gated with MOTOR ON 88 to prevent applying a voltage to the motor 54 when motor operation is not desired.

$V_{pet}$ 76 is also connected to the output processor 50 for determining when to print the next column of Print Data 150. In the preferred embodiment of the present invention, the output processor 50 uses $V_{pet}$ 76 as a position indicator to identify the current position of the tape 31 and ribbon 32 disposed between the printhead assembly 22 and the platen assembly 24. The output processor 50 uses the digital pulses of $V_{pet}$ 76 to directly determine when to print the pixel data as a function of counting a specified number of pulses on $V_{pet}$ 76. When the tape 31 and ribbon 32 are advanced past the transfer station at a rate of 1 inch per second and each column of Print Data 150 is to be printed at 300 pixels per inch, the tape 31 will move one pixel width past the transfer station 20 every 3.3. milliseconds (ms). Accordingly, by using the leading edge of every fourth pulse on $V_{pet}$ 76 (at 1200 Hz), a reference position for the beginning of each column of pixel data is established. The reference position ties the outputting of the Print Data 150 directly to the advancement of the tape 31 and ribbon 32 past the transfer station 20 to insure that each succeeding column of Print Data 150 will be properly aligned.

Figure 6:
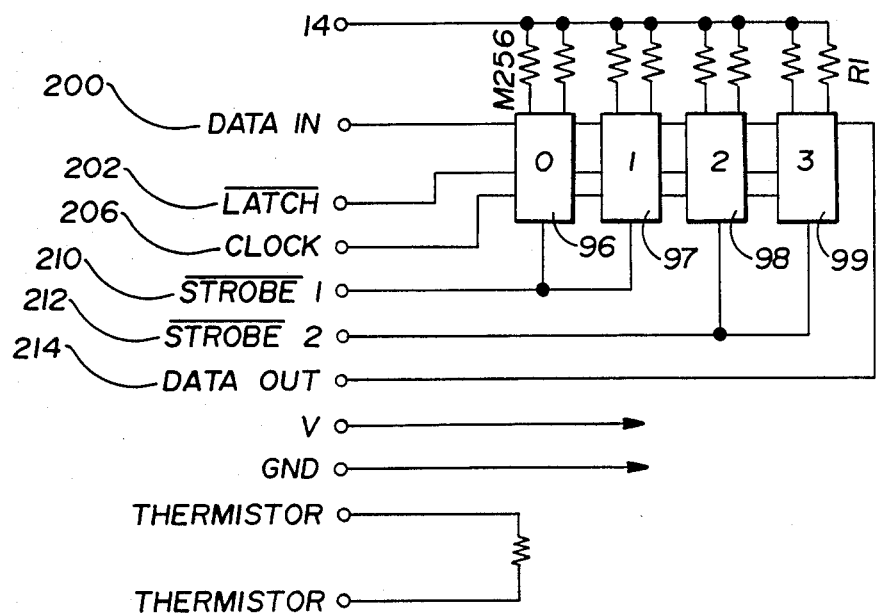
FIG. 6 is a functional schematic diagram of the input and output signals used to drive the printhead of the transfer device.
Figure 7:
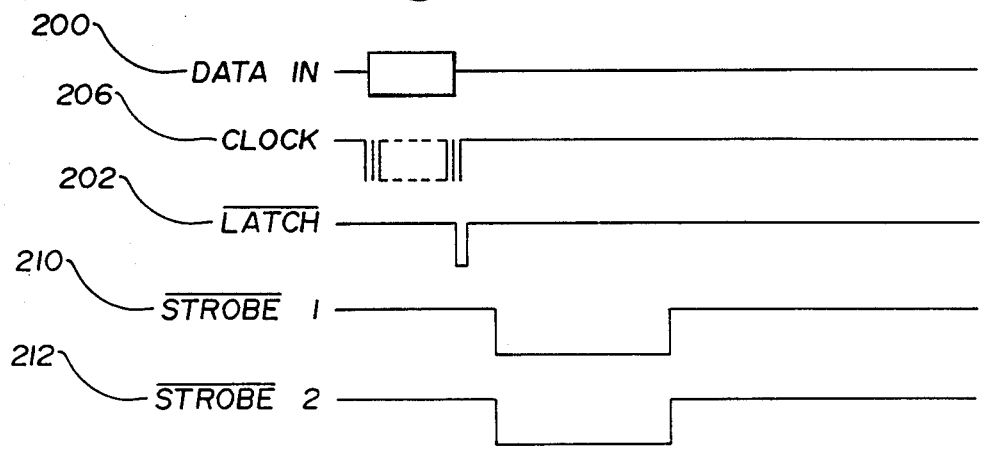
FIG. 7 is a timing diagram of the input and output signals used to drive the printhead of the transfer device.

With specific reference to the schematic diagram shown in FIG. 6 and the timing diagram shown in FIG. 7, the outputting of Print Data 150 to the printhead 90 will be described. Print Data 150 is clocked into the driver chips 96, 97, 98 and 99 by serially placing Print Data 150 on DATA IN 200, waiting until CLOCK 206 has clocked all of the pixel data that comprises one column of Print Data 150 and then enabling LATCH 202 to latch Print Data 150 into the respective driver chips. Pixel data bits 1-64 of Print Data 150 are latched into driver chip 99, pixel data bits 65-128 are latched into driver chip 98, pixel data bits 129-192 are latched into driver chip 97, and pixel data bits 193-256 are latched into driver chip 96. The driver chips allow the next column of pixel data to be transferred and latched into one of the driver chips 96-99 of the printhead 90 while the current column of pixel data is being printed. When Print Data 150 has been transferred and latched into the respective driver chips, the output processor 50 enables STROBE 210 AND STROBE 212 for a specific time period to apply the heating voltages to the selected heating elements 94. In the preferred embodiment of the present invention, the printhead 90 is equipped with two separate STROBE lines, STROBE 1 (210) and STROBE 2 (212) to allow for the more efficient driving of the driver chips. STROBE 210 and STROBE 212 are tied together and do not operate independently of one another. STROBE 210 and STROBE 212 activate the driver circuit 95 to apply a specific heating voltage to each of the heating elements 94 in the printhead 90 for a predetermined time peirod. For the particular printhead and tape of the preferred embodiment, STROBE 210 and STROBE 212 are activated for a fixed time period of 1.4 ms to achieve the optimum print quality.

As Print Data 150 is being strobed into the driver chips 96, 97, 98, and 99, the output processor 50 also signals the rasterization processor 52 by means of Interrupt Signal 160 (shown in FIG. 3) that another column of Print Data 150 may be loaded into FIFO Buffer 134. In the preferred embodiment, Print Data 150 is stored in FIFO 134 as a series of 33 bytes representing 1 byte of control information or Control Signals 140 and 32 bytes of pixel data 130 organized to be printed as a single vertical column.

As described in more detail in co-pending application entitled PIXEL PREHEAT SYSTEM FOR AN AUTOMATED THERMAL TRANSFER DEVICE, filed Mar. 21, 1988 and identified by Ser. No. 170, 756, which is fully incorporated by reference herein, each of the heating elements 94 is preheated with a unique pixel preheat data value. The pixel preheat value for the next pixel to be printed is determined by the value of the next pixel to be printed and the value of the current pixel to be printed. Because the preferred embodiment of the driver circuit 95 is provided with Data Out 214, the output processor 50 can make use of the current pixel values as they are being shifted out of the driver circuit 95 to calculate the pixel preheat values for the next column of pixel data.

Figure 8:
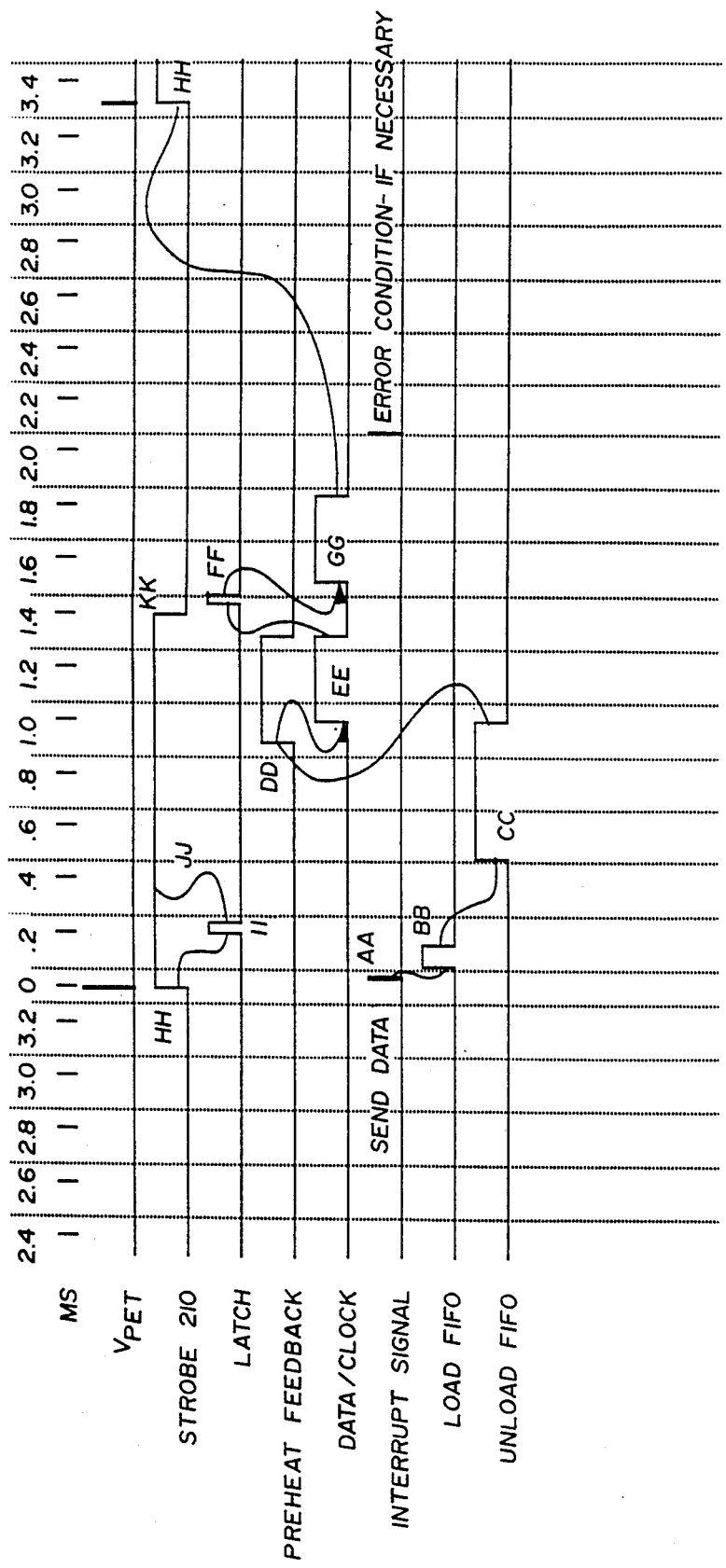
FIG. 8 is a timing diagram of the overall data flow as controlled by the processing means fo the present invention.

Having described the operation of the elements of the output processor 50 and the printhead assembly 22 the overall timing and data flow can best be understood by reference to FIG. 8. The timing sequence and data flow is shown for the transfer of a single column of Print Data 150 from the rasterization processor 52 to the output processor 50, to the printhead 90 to be printed, and then finally back to the output processor 50 to be used in calculate the pixel preheat values for the next column of Print Data 150. This entire process is completed once every 3.3 ms. This results in an effective printing rate of 1 inch per second. $V_{pet}$ 76 defines the duration of each cycle, with the leading edge of every fourth pulse indicating the start of a new column to be printed. At AA of FIG. 8, the output processor 52 raises Interrupt Signal 160 to tell the rasterization processor 52 to load FIFO Buffer 134 with a new column of Print Data 150 which occurs at BB. At CC, the output processor 50 unloads Print Data 150 from FIFO Buffer 134 and examines the control byte for a control code as explained below. If the data in FIFO Buffer 134 is pixel data to be printed, the output processor 50 sets up Print Data 150 to be combined with the pixel data currently in the printhead 90 and shifted out beginning at DD to generate the pixel preheat values. At EE, the pixel preheat values for Print Data 150 are strobed into the driver chips 96, 97, 98, and 99 and subsequently latched at FF. At GG, the actual pixel values for Print Data 150 are strobed into the driver chips 96, 97, 98, and 99 and will remain ready to be latched into the printhead elements 94 at the beginning of the next print cycle. From GG to HH, the printhead elements 94 are on the cooldown phase of their heating cycle from the previous print cycle and by HH all of the heating elements 94 should have returned to a temperature just below the threshold transfer temperature of the thermal ribbon 32. At HH, STROBE 210 and STROBE 212 are activated for 1.4 ms and the printing voltage is applied to the pixel values for each of the heating elements 94, which at HH will be the pixel preheat values that were latched at FF. As will be seen at II, the pixel preheat voltages are applied for approximately 0.2 ms, after which LATCH 206 is enabled and the actual pixel values for Print Data 150 are provided to the heating elements 94. During this 50 microsecond latch time, the heating voltage will still be applied to the heating elements 94 and the pixel value will be transient, but will not be sufficiently heated or cooled to affect the temperature of each heating element 94. Consequently, the temperature of each heating element 94 will be determined by the pixel value of Print Data 150 now shifted into each of the heating elements 94. The printing voltage is applied or not applied depending on the pixel data value for the duration of the 1.4 ms period until KK, when the applied printing voltage is removed. The temperature of those heating elements to which printing voltage was applied are then allowed to return to just below the threshold temperature.

In the preferred embodiment, the application of the printing voltages to the heating elements 94 is controlled by the driver circuit 95. The printhead 90 is supplied by two voltage supples, a logic voltage level (+5V) and a printing voltage level (+16V). The printhead 90 is provided with a gross feedback mechanism in the form of a thermistor 214 to regulate the overall temperature of the printhead 90 and associated heat sink 91. The output of the thermistor 214 is used by the driver circuit 95 to adjust the amplitude of the printing voltage used to drive the heating elements 94 based on the measured temperature of the heat sink 91. An alternative embodiment of the present invention allows the output processor 50 to monitor the overall temperature of the printhead 90 and associated heat sink 91, and adjust the power level of the printing voltages by adjusting the duration of STROBE 210 and STROBE 212 to compensate for changes in ambient temperature, whether those temperature changes are external or internal to transfer device 12. In either case, it is advantageous to be able to adjust the power level of the printing voltages so as to prolong the life of the heating elements 94 and to prevent over-heating or over-liquefying of the transfer ribbon 32 which may result in running or smearing of the characters on the tape 31.

In addition to controlling the printing of Print Data 150 by the printhead assembly 22, the output processor 50 may also perform various other control functions inherent in controlling a thermal transfer device 10 of the type contemplated by the present invention. The output processor 50 examines the control byte in FIFO Buffer 134 to determine whether the next set of Print Data 150 is pixel data to be output to printhead 90 or whether the control byte of Print Data 150 is one of several control functions that may be requested of the output processor 50. These functions include: Stop Print, Start Print, Advance Tape, Cut Tape, and Tape Inquiry.

Stop Print instructs the system to immediately cease printing of data and causes output processor 50 to stop drive motor 54. The Stop Print instruction also causes the platen assembly 24 to disengage from the printhead assembly 22 via a control signal 216.

Start Print instructs the system to begin printing and causes the output processor 50 to engage the platen assembly 24 and then start drive motor 54. To insure that the drive motor 54 is up to the proper speed, the output processor 50 monitors $V_{pet}$ 76 for a specified time period to determine if the expected number of signals are received. The output processor 50 will not begin printing any pixel data until it determines that $V_{pet}$ 76 is within a specified range of the expected rotational speed for the drive motor 54. If the drive motor 54 does not come up to speed within a second specified time period, the output processor 50 would report an error condition and no printing would be performed.

Advance Tape instructs the system to advance the tape 31 and ribbon 32 a specified number of print columns past the transfer station 20. The output processor 50 disengages the platen assembly 24 and then monitor $V_{pet}$ 76 to count the number of print columns that are advanced past the transfer station 20. When the desired number of print columns is reached, the drive motor 54 is stopped and the output processor 50 waits until either a Start Print or Cut Tape control command is received.

Tape Cut instructs the system to activate a tape-cut mechanism 220 by causing the output processor to activate an actuator 222 via an appropriate control signal 224 causing forward movement of a blade to cut the tape 31 and ribbon 32. When the blade is advanced to its farthest point of travel, the output processor 50 deactivates the tape-cut mechanism 220 causing the return of the blade to its retracted positon.

The output processor 50 also monitors the tape indicator 230 to check whether the tape 31 and ribbon 32 are being presented to the transfer station 20. In a preferred embodiment, the tape indicator 230 uses a light source and a photo-detector located in a photo-detector housing 232 to sense the presence or absence of the tape 31 and ribbon 32 and reports this information to the output processor 50 via the control signal 234. In an out of tape condition, the output processor 50 will execute a Stop Print command and send a control message to the input module 40, for example, indicating that an out of tape message should be displayed to the operator.

While each of the control commands for the output processor 50 has been described individually, it is contemplated that the control commands may be used in conjunction to cause the output processor 50 to perform a series of operations. For example, a sequence of control commands of Stop Print, Advance Tape, Cut Tape, Advance Tape, and then Start Print might be used to cause the transfer device 10 to end a first strip of tape and begin a second strip of tape. It is also apparent that multiple control commands could be combined into a single control command, for example Stop Print, Advance Tape, and Cut Tape might be received by the output processor 50 as an End of Line Cut Command.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. A control system for an automated thermal transfer device having an image transfer station defined by a printhead for transferring a selected image comprised of a set of columns of pixel data from a ribbon to a tape and having a tape-ribbon drive means for advancing said ribbon and tape past said image transfer station, comprising:

detector means for detecting the speed and position of tape and ribbon past said image transfer station;

feedback means operably connected to said detector means and said drive means for controlling the speed of said tape and ribbon past said image transfer station; and processing means operably connected to said detector means and said printhead for transferring said columns of pixel data to said printhead in response to a position of said tape and ribbon.

2. The control system of claim 1 wherein the position of said tape and ribbon is determined in relation to the speed of the tape and ribbon such and the width of each of said columns of pixel data is uniform.

3. The control system of claim 2 wherein said tape-ribbon drive means is a rotary drive means.

4. The control system of claim 3 wherein said detector means detects the speed of said tape and ribbon by detecting the rotational speed of said drive means.

5. The control system of claim 4 wherein said detector means is an optical interrupter disposed between a light source and a photo detector.

6. The control system of claim 1 wherein said feedback means is a phase comparator for comparing the frequency of a signal produced by said detection means and a reference frequency and generating an output signal for controlling the speed of said drive means.

7. A thermal transfer tape lettering apparatus for transferring a selected image from a ribbon to a tape comprising:
an image transfer station;
means for supplying ribbon and tape at said image transfer station;
means for generating print data comprised of a set of columnar pixel data representing said selected image;
printhead means for transferring said image from said ribbon to said tape comprised of a column of thermal heating elements, each of said heating elements being responsive to a unique bit of data in said print data to be selectively heated for a duration of time;
cylindrical platen means for operably engaging said ribbon and tape with said printhead means;
rotary drive means for advancing said ribbon and tape past said printhead means, said drive means located downstream from said platen means.
detector means operably connected to said drive means for detecting the rotational speed of said drive means and generating a speed signal;
control means operably connected to said rotary drive means and said detector means for receiving said speed signal and generating a drive control signal to selectively alter the rotational speed of said drive means to maintain said speed signal within a predefined rotational speed range; and
processing means operably connected to said printhead means and said control means for receiving said print data and transmitting said print data to said printhead means in a predefined relationship with said speed signal such that each successive set of said columnar pixel data is printed on said tape in proper alignment with the previous set of said columnar pixel data.

8. The image transfer station of claim 7 wherein said printhead means comprises:
a printhead having a single column of thermal heating elements; and
control circuitry having a memory location corresponding to each said heating elements such that said set of columnar pixel data may be latched into said memory locations;
whereby each of said heating elements is simultaneously responsive to a data bit in said memory locations.

9. The image transfer station of claim 8 wherein said heating elements are responsive to the amplitude and duration of a voltage applied to each of said elements.

10. The image transfer station of claim 7 wherein each of said thermal heating elements comprises a square resistive element abuttably adjoining the adjacent heating elements.

11. the image transfer station of claim 7 wherein said rotary drive means comprises a pair of rotatable drive rollers having said ribbon and tape disposed therebetween, one of said driver rollers operably connected to a pulse driven motor.

12. The image transfer station of claim 7 wherein said detector means is comprised of a rotational optical encoder having an optical interrupter operably connected to said drive means and disposed between a light source and a photo-detector to generate said speed signal.

13. The image transfer station of claim 7 wherein said control means is a reference signal and a phase comparator for comparing said speed signal to said reference frequency.

14. A method for controlling a thermal tape lettering apparatus having an image forming station for forming a selected image on a tape, said selected image comprised of a successive sets of pixel data, comprising the steps of:
monitoring the rotational speed of a drive means for advancing said tape past said image forming station;
controlling the rotational speed of said drive means by maintaining the rotational speed within a specified frequency lock range; and
printing each of said successive sets of columnar pixel data in response to the rotational speed such that the width of each of said successive sets of columnar pixel data is uniform.

15. A control system for an automated thermal transfer device for transferring a selected image represented by successive sets of columns of pixel data from a ribbon to a tape, said transfer device comprising a printhead having a single column of square resistive heating elements abuttably adjoining the adjacent heating elements, each of said heating elements being responsive to the amplitude and duration of a voltage applied to each of said elements by a control circuit having a memory location corresponding to each of said heating elements that said pixel data is latched into, said thermal transfer device also including a cylindrical platen for engaging said ribbon and tape between said platen and said printhead, and a pair of rotatable drive rollers located downstream from said printhead and having said ribbon and tape disposed therebetween, one of said drive rollers operably connected to a pulse-driven motor, comprising:
a rotational speed detector operably connected to said motor and generating a digital pulse train having a frequency in a specified relation to the rotational speed of said motor;
a phase comparator operably connected to said rotational speed detector, a predefined reference frequency and said motor to control the rotational speed of said motor within a predefined frequency lock range; and
a microprocessor operably connected to said rotational speed detector and said control circuit of said printhead for transferring said successive sets of columns of pixel data to said printhead in response to said digital pulse train such that the width of each of said columns of pixel data is uniform.

* * * * *

UNITED STATES PATENT AND TRADEMARK OFFICE
CERTIFICATE OF CORRECTION

PATENT NO. : 4,836,697

DATED : June 6, 1989

INVENTOR(S) : Michael A. Plotnick, et al.

It is certified that error appears in the above-identified patent and that said Letters Patent is hereby corrected as shown below:

Col. 1, line 38, delete "us" and insert --use-- therefor

Col. 1, line 39, after the word overhead, delete the "," therefor.

Col. 4, line 23, delete "gnerally" and insert --generally-- therefor.

Col. 4, line 64, delete "roller" and insert --rollers-- therefor.

Col. 7, line 60 delete "since" and insert --Since-- therefor.

Col. 9, line 53, delete "peirod" and insert --period-- therefor.

Col. 11, line 63 delete "monitor" and insert --monitors- therefor.

UNITED STATES PATENT AND TRADEMARK OFFICE
CERTIFICATE OF CORRECTION

PATENT NO. : 4,836,697

DATED : June 6, 1989

INVENTOR(S) : Michael A. Plotnick, et al

It is certified that error appears in the above-identified patent and that said Letters Patent is hereby corrected as shown below:

Col. 13, line 27, delete "." and insert --;-- therefor.

Signed and Sealed this

Twenty-second Day of May, 1990

Attest:

HARRY F. MANBECK, JR.

*Attesting Officer*      *Commissioner of Patents and Trademarks*